Oct. 23, 1923.

C. HOLMDAHL 1,471,606

COMBINATION PUMP JACK AND SPEED REDUCING MECHANISM

Filed Feb. 8, 1922

Inventor
Charles Holmdahl
by Orwig and Hague, Attys.

Patented Oct. 23, 1923.

1,471,606

UNITED STATES PATENT OFFICE.

CHARLES HOLMDAHL, OF KELLOGG, IOWA.

COMBINATION PUMP JACK AND SPEED-REDUCING MECHANISM.

Application filed February 8, 1922. Serial No. 534,939.

*To all whom it may concern:*

Be it known that I, CHARLES HOLMDAHL, a citizen of the United States, and a resident of Kellogg, in the county of Jasper and State of Iowa, have invented a certain new and useful Combination Pump Jack and Speed-Reducing Mechanism, of which the following is a specification.

The object of my invention is to provide a speed reducing mechanism of simple, durable and comparatively inexpensive construction which may be either used in connection with a pump jack or for the purpose of driving belt driven machinery.

A further object is to provide a speed reducer having a comparatively few gear devices so arranged that they will have a maximum amount of strength with a minimum amount of material in their construction, and so arranged that they may be run constantly in a lubricant and enclosed to protect them from dirt and the like.

A further object is to provide a speed reducing gear mechanism so constructed that a number of teeth of the coacting gears may be constantly in mesh with each other.

A further object is to provide a speed reducing mechanism which may be easily and quickly adapted either to be used with belt driven machinery or with a pump jack.

These and other objects will be apparent to those skilled in the art.

My invention consists in the construction, arrangement and combination of the various parts of the device, whereby the objects contemplated are attained, as hereinafter more fully set forth, pointed out in my claims, and illustrated in the accompanying drawings, in which:

Figures 1, 2:
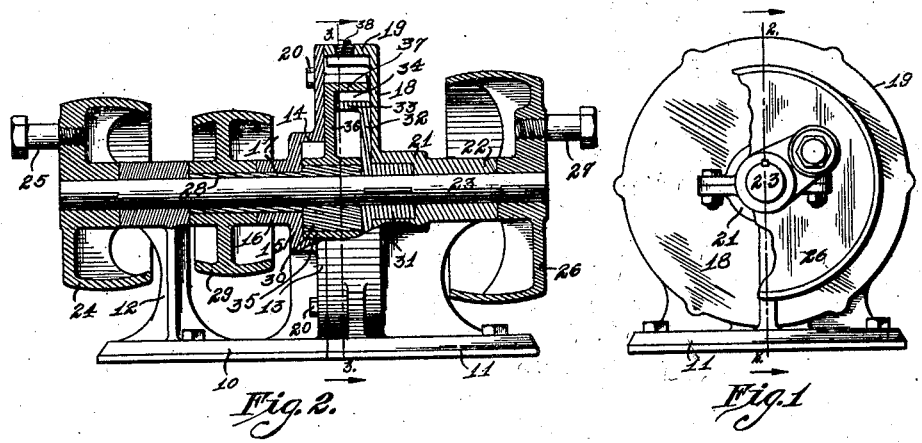
Figure 1 is an end view of my improved speed reducing device.
Figure 2 is a vertical and longitudinal sectional view taken on the line 2—2 of Figure 1.

My improved speed reducing device is mounted on base members 10 and 11.

The base member 10 is provided with a bearing support 12 near one end, and a disc plate 13 at its opposite end, the said disc being mounted perpendicular with the base 10.

The said disc 13 is provided at its central portion with a cylindrical recess 14 concentric with the center of the disc.

The central portion of the end member 15 of said recess is provided with a bearing 16 having a suitable opening 17.

The base member 11 is provided with a disc 18 of the same diameter as the disc 13, and provided at its edge with a laterally extending annular flange 19. This flange 19 is designed to have its free edge rest adjacent to the edge of the disc 13 so that a cylindrical space is provided between the discs 13 and 18, the said discs being secured together by means of transversely arranged bolts 20.

The central portion of the disc 18 is provided with a cylindrical hub 21 to which a bearing 22 is secured. The bearing 22 is designed to receive a shaft 23, which has one end extending beyond said bearing, and the opposite end extending through the opening 17 of the member 15 and through and beyond the bearing member 12, the said shaft being rotatively mounted.

The outer end of the shaft 23 adjacent to the bearing 12 is provided with a belt wheel 24, the web portion of which is provided with a wrist pin 25 which is so located that the said pin and the web of the wheel 24 forms a crank to which a pump jack of any of the ordinary construction may be easily attached, the said pin 25 being detachably secured into the web of the wheel 24 for the purpose of attaching or detaching the pump jack.

The opposite end of the shaft 23 is provided with a similar belt wheel 26 of a larger diameter than the belt wheel 24, the web of which is provided with a wrist pin 27 similar to the wrist pin 25, and so located that it will have the same throw as the pin 25, so that the two pins may be worked in unison. This provides means for attaching the device to that type of pump jacks having two connecting rods.

If it is desired to use the speed reducer with a jack having a single connecting rod, said rod may be connected to either one of the wrist pins.

For driving the shaft 23, I have provided the following mechanism:

Rotatively mounted on the shaft 23 within the opening 17 of the member 15, I have provided a sleeve 28, the outer end of which is provided with a belt wheel 29, and the inner end of which is provided with an eccentric 30 which is rigidly secured thereto, and designed to operate in the cylindrical portion 14.

Adjacent to the end of the sleeve 28, I have provided a hub member 31 keyed to the shaft 23 and rotatively mounted in the cylindrical hub 21. This hub 31 is provided with a disc which is of a considerable less diameter than the disc 18 and mounted adjacent to its inner face.

The edge of the disc 32 is provided with a flange 33 carrying a number of gear teeth 34 and forms what I shall term the external gear. In the device illustrated in the drawings, I have used thirty teeth in this gear. The inner face of the flange 19 of the disc 18 is provided with forty teeth of the same pitch as the teeth 34 and forms what I shall term the internal gear.

Thus it will be seen that an annular space is provided between the teeth of the external and internal gears.

Rotatively mounted on the eccentric 30, I have provided a sleeve 35 which is designed to carry a disc 36. This disc 36 is of a diameter substantially equal to the difference between the pitch diameters of the internal and external gears, and provided at its edges with a laterally extending annular flange 37.

The flange 37 has its inner and outer faces provided with a series of teeth of the same pitch as those before mentioned, the outer face carrying thirty-eight teeth while the inner face carries thirty-two teeth.

Figure 3:
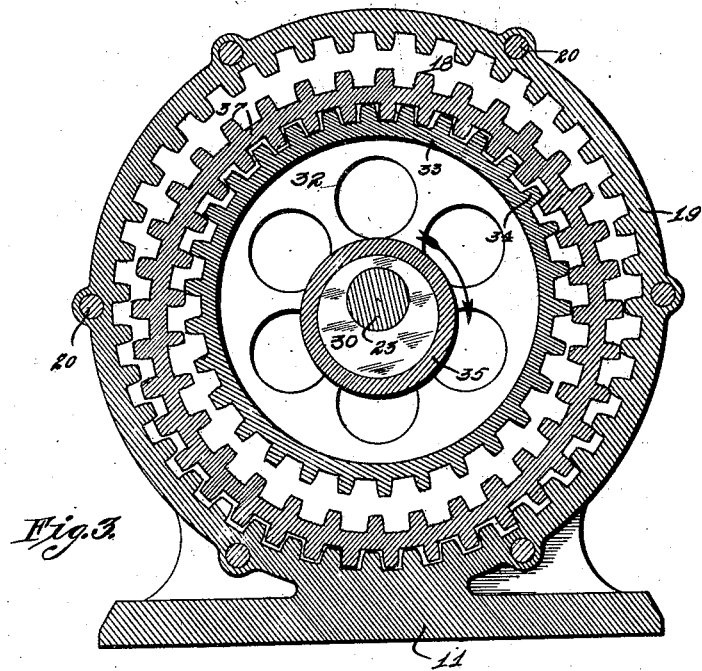
Figure 3 is a vertical, transverse, sectional view taken on the line 3—3 of Figure 2.

By this arrangement, it will be seen that the annular flange 37 is always eccentric, with the internal and external gears so arranged that a number of the teeth of its inner face will mesh with a number of the external gear, while a number of the teeth of its outer face will mesh with a number of the teeth of the internal gear, these two points of contact being always diametrically opposite from each other, as clearly shown in Figure 3.

It will further be seen that if the pulley 29 and the sleeve 28 are rotated, that the eccentric 30 will also be rotated which will cause the flange 37 to be moved about between the flanges 33 and 19 in an eccentric manner so that the teeth before described will constantly mesh with each other.

It will also be seen that since the outer face of the flange 37 has two less teeth than the internal gear, the said flange 37 will be rotated in an opposite direction from that which the eccentric 30 is rotated a distance equal to the sum of the pitch of two teeth of the flange 37; or since there is thirty-eight teeth, the said flange 37 is moved an angle equal to 1/19th of the circumference of a circle, or 1/19th of one revolution.

A similar action takes place between the teeth of the inner face of the flange 37 and those of the external gear 33, in which the said gear 33 is also rotated 1/19th of a revolution plus the pitch of two teeth, or 1/15th of a revolution since there are thirty teeth in this gear. The speed reduction will then be 1/19th plus 1/15th which equals 34/285th, that is, the gear 33 is rotated 34/285th of a revolution, while the belt wheel 29 is being rotated one revolution and in the opposite direction.

It will be seen that a large number of different gear ratios may be obtained with a similar construction merely by changing the number of teeth of the gears and the diameter of the annular member 37 and the disc 32 so that a difference of two teeth is recommended between the coacting gear members, as I find that this number works out better than any other in a gear of this size. It is possible to so design the gears that a difference of one or three teeth between the coacting gears may prevail. With the single tooth this cuts down its depth and does not give it as good a shape as where I provide for a difference of two or three teeth between the coacting gears.

Thus it will be seen that if the pulley 29 is driven at a predetermined speed, the shaft 23 will be driven at a proportionately less speed, the speed reduction herewith given is substantially correct to use between the ordinary farm engines and pump jacks.

It will further be seen that if the operator wishes to use the device for reduction of speeds between belt driven machinery, he can do so by applying a belt to either of the pulleys 24 or 26, the pulley 26 being larger in diameter than the pulley 27 consequently giving a little higher speed. Or, if the operator desires to obtain a speed higher than that of the engine, he may do so by placing the engine belt on either the pulleys 24 or 26, and the pulley 29 will be driven at a speed higher than that of the pulleys 24 and 26.

Thus it will be seen that I have provided a speed reducing device of comparatively simple, durable and inexpensive construction which may be easily and quickly adapted for a number of purposes, and one in which several speed ratios may be obtained by placing the belts on the proper pulleys.

It will also be seen that the gear devices may always run in a lubricant which may be placed in the gear chamber through a plug 38.

It will also be seen that the gears are protected from dirt and foreign matter, and further that the gears are considerably stronger than the ordinary spur gear due to the fact that several of the teeth of each coacting set of gears are constantly in mesh with each other.

I claim as my invention:

An annular internal gear member designed to form a support, the said annular member being provided with a disk portion at one end, the said disk portion being provided with a central and laterally extending hub member, the inner end of said hub member being recessed, a shaft rotatively mounted in said hub, a gear member within the said annular member and concentric therewith, said gear member being provided with a hub secured to said shaft and mounted within the recess of the first said hub, a sleeve rotatively mounted on said shaft, the inner end of said sleeve being adjacent to the hub of the second said gear and provided with an eccentric, a bearing member rotatively mounted on said eccentric and provided with a disk portion perpendicular thereto, the outer edge of said disk being provided with an annular internal and external gear member, the external gear member being designed to coact with the first said internal gear member while the internal gear member of the last said gear member is designed to coact with the gear of the second said gear member, a disk plate detachably secured to the open end of the first said annular gear member to form a closure for all of said gear members and provided at its central portion with a hub to rotatively receive the said sleeve, and means for driving the outer end of said sleeve, the last said disk being designed to lay adjacent to the disk of said eccentric bearing.

Des Moines, Iowa, January 5, 1922.

CHARLES HOLMDAHL.